US011567975B1

(12) United States Patent
Day, Jr. et al.

(10) Patent No.: US 11,567,975 B1
(45) Date of Patent: Jan. 31, 2023

(54) SYSTEM AND METHOD FOR USER INTERACTIVE CONTEXTUAL MODEL CLASSIFICATION BASED ON METADATA

(71) Applicant: NVISNX, Inc., Santa Monica, CA (US)

(72) Inventors: Glenroy E. Day, Jr., Marina del Rey, CA (US); Tushar Padhiar, San Diego, CA (US); Gagan Sarawgi, Milpitas, CA (US)

(73) Assignee: NVISNX, Inc., Santa Monica, CA (US)

( * ) Notice: Subject to any disclaimer, the term of this patent is extended or adjusted under 35 U.S.C. 154(b) by 0 days.

(21) Appl. No.: 17/520,124

(22) Filed: Nov. 5, 2021

(51) Int. Cl.
*G06F 16/00* (2019.01)
*G06F 16/28* (2019.01)
*G06F 9/451* (2018.01)

(52) U.S. Cl.
CPC ............ *G06F 16/285* (2019.01); *G06F 9/451* (2018.02)

(58) Field of Classification Search
CPC ............................... G06F 16/285; G06F 9/451
USPC .......................................................... 707/737
See application file for complete search history.

(56) References Cited

U.S. PATENT DOCUMENTS

| 11,030,150 B1* | 6/2021 | Sokolov | .................. | G06F 16/11 |
| | | | | 707/707 |
| 11,044,256 B1* | 6/2021 | Soby | .................. | G06F 16/2379 |
| | | | | 707/707 |
| 2018/0232528 A1* | 8/2018 | Williamson | .......... | G06F 16/285 |
| | | | | 707/707 |
| 2019/0207967 A1* | 7/2019 | Vashisht | ............. | H04L 63/1425 |
| | | | | 707/707 |
| 2019/0354544 A1* | 11/2019 | Hertz | ....................... | G06N 5/00 |
| | | | | 707/707 |

(Continued)

*Primary Examiner* — Alexandria Y Bromell
(74) *Attorney, Agent, or Firm* — Vedder Price P.C.

(57) ABSTRACT

A system and a method for contextual categorization of data comprises a server having a processor and a non-transitory computer-readable storage medium in electronic communication with the processor and comprising program instructions executable by the processor to access an initial inventory of data set and metadata associated with the initial inventory of data set. The system is then configured to classify the initial inventory of data set by using the metadata into (a) reduced set of data comprising high level sensitivity classification and (b) a remainder data set. The system and method can be further configured for contextual categorization of data that involves receiving an initial data set to be categorized; establishing a library of contextual classifiers, the library comprising (1) a set of predetermined high level sensitivity classifications and (2) a set of user-generated business-specific sensitivity classifications subordinated below the high level sensitivity classifications; identifying and removing redundant, outdated, trivial or abandoned (ROTA) data from the initial data set to create a reduced data set and a remainder data set of ROTA data; applying the user-generated business-specific sensitivity classifications to the reduced data set to create a first set of classified data and a second set of unclassified data; and iteratively applying additional user-generated business-specific sensitivity classifications to the both the first set of classified data and the second set of unclassified data until all data in the reduced data set has been classified in exactly one use-generated business-specific sensitivity classification.

15 Claims, 12 Drawing Sheets

(56) References Cited

U.S. PATENT DOCUMENTS

| | | | |
|---|---|---|---|
| 2021/0192412 A1* | 6/2021 | Krishnaswamy | ............................ G06Q 10/06316 707/707 |
| 2021/0224298 A1* | 7/2021 | Singi | ...................... G06N 20/00 707/707 |
| 2021/0263900 A1* | 8/2021 | Joyce | ..................... G06N 20/00 707/707 |
| 2021/0397726 A1* | 12/2021 | Kulaga | ................. G06F 16/285 707/707 |

* cited by examiner

SYSTEM AND METHOD FOR USER INTERACTIVE CONTEXTUAL MODEL CLASSIFICATION BASED ON METADATA

TECHNICAL FIELD

The specification disclosed herein relates to technical improvements in generating models for contextual classification of data by business users such as enterprise data custodians. More specifically, the innovations provide GUI-based tools for creating and using a hybrid rules-based and machine learning-based artificial intelligence contextual classification system. The system and method leverages user-generated and context-specific sensitivity hierarchies by allowing the data to be classified using metadata attributes beyond what a machine learning or computer-based algorithm engine can accomplish alone and classify data in a contextually sensitive manner, allowing multiple end uses, such as in data privacy management, compliance and document retention.

BACKGROUND

Managing and governing data is an important aspect of competitive intelligence. The rapid information explosion of data creates increased demands for creating solutions to analyze data and predict and recognize data based on usage. Proper classification of data based on data sensitivity, including, for example, levels of confidentiality of business records, is necessary to increase business efficiencies, address risk and compliance efforts, and enhance companies' revenues and earnings. Prior art provides various options to predictively analyze such information and data, but fail in essential respects.

One such method of managing data is content analytics of data using rules-based classification in combination with machine-learning (ML) technologies from the field of artificial intelligence (AI). Tasks such as identifying exact and near-duplicates, enriching the metadata of text and multimedia data, identifying relevant (e.g., semantic) information, facts and events, and clustering the information, can be provided by using ML- and AI-driven content analytics systems. However, such prior art content analytics systems are not well suited to perform any sort of contextual data classification based on a business-specific sensitivity classification. More specifically, current ML-based systems have many disadvantages when it comes to full-scale contextual classification of structured and unstructured data comprising multiple categories of documents and information, in part because ML-based systems cannot identify business-specific sensitivity classifications on their own. In addition, ML-based systems are very good at processing large amounts of data, but are ineffective at processing and classifying data based on metadata, and the metadata is frequently where the business-specific sensitivity classifications are best derived.

Machine learning over text documents is an active area of current research and development. For instance, one such research involves going beyond the conventional bag-of-words (BOW) approach—representing the text by more linguistic features such as noun phrases and partial interpretations of the meaning of the text. In addition to using BOW to classify documents, other ML-based text learning approaches include learning to extract information from text (for example, learning to extract the title, speaker, room and subject, given online seminar announcements). Attempts have been made to improve prior art document classification systems and methods by using ML based on AI classification systems. However, all such document classification systems and methods fail to provide reliable, contextual classification of data. Conventional document classification systems are typically limited in use because they either rely on rules that are difficult to specify and modify or employ automated techniques such as ML/AI that are non-transparent and difficult to train for custom classification categories. Therefore, there is a need for a system that addresses the shortcomings and the various disadvantages of the prior art systems.

While AI classification systems may be used to classify data (hereinafter "documents" or "files," noting that neither term should be limited to meaning "text" documents), these systems are complex and must be modified to classify against large amounts of training data. Further, the parameters they use are not often apparent, leading users to not understand how classification decisions are made. In addition, the time it takes to implement such systems is often prohibitive as they cannot be readily adapted to specific use cases, e.g., enterprise-specific document classification systems. Moreover, there is focus on classifying data based solely on its content rather than its provenance, current or past ownership or use.

An example of the shortcomings of current data classification systems is as follows. A business may have a document policy that specifies a high level categorization of data sensitivity based, for example, on the categories of: public, internal, confidential and restricted. An existing ML-based/AI engine may be taught that all documents relating to a topic, e.g., claim for insurance coverage, per the document policy are to be categorized as "confidential." Further, existing ML-based/AI engines may also be able to identify a subcategory of "confidential" documents that should be classified as sub-topics, for example "insurance claims." However, existing ML-based/AI engines are unable to further distinguish documents based on sub-type, e.g., specific contextual sensitivity classifications that distinguish between the type of insurance claims. A prior art system may allow certain company employee access to data labeled "confidential-insurance claims," but cannot further restrict access based on the type of claim without user-specific contextual sensitivity classifications. For example, a "cyber-security" claim may have a different set of permitted users than a "workers' compensation" claim, but prior art ML-based/AI engines are not capable of creating such further contextual sensitivity classifications on their own. A need exists to supplement ML-based/AI engines and other data sorting techniques with user-generated contextual sensitivity classifications.

Therefore, there is a need for a system that addresses the shortcomings and the various disadvantages of the prior art systems of analyzing and categorically classifying unstructured and unclassified data sets. The foregoing problems and shortcomings are addressed by the illustrative embodiments of the present disclosure, which provide improved systems and methods that address limitations of the current data classification approach.

In order to provide a more useful system, an embodiment provides a document classification system that prepares large, initial data inventory containing documents to be classified. These documents may be enriched (by integrated code or an external service), such as by adding metadata labels. The system uses available document metadata to gain a foothold in the classification problem and enlists the end user (e.g., data custodian) in order to facilitate complete, accurate and contextual data classification, avoiding the need to use custom-trained AI models (noting that AI/ML models may be used, but are employed in a targeted fashion by the system).

In addition, there is need to supplement conventional document classification systems by developing GUI-based tools for creating and using a hybrid rules-based and machine learning-based artificial intelligence contextual classification system. The novel and innovative systems and methods will be designed to perform the following functions: (a) triggering automated workflows or implementing robotic process automation, e.g., based on classification results; and/or (b) incorporation of data connectors and data ingestion techniques along with automated analysis, e.g., metadata labeling or contextual analysis of document content using AI/ML services (which may be offered by third parties).

The disclosure provides a hybrid rules-based and machine learning-based artificial intelligence system and method for contextual categorization of data. The novel and unique system and method of contextual data classification is configured to capture data attributes from a variety of sources and provide enhanced data management, analysis and contextual classification of data to support critical revenue-generating business functions. These and other advantages of the disclosure, as well as additional inventive features, will be apparent from the description of the disclosure provided herein.

BRIEF SUMMARY

A novel and unique system and method for contextual classification comprising a contextual classification engine configured and enabled to contextually classify structured and/or unstructured data is provided.

The system for contextual classification of data comprises at least one server having a processor and a non-transitory computer-readable storage medium in electronic communication with the processor and comprising program instructions executable by the processor to access an initial inventory of data set and metadata associated with the initial inventory of data set. The system is then configured to classify the initial inventory of data set by using the metadata into (a) a reduced set of data comprising high level sensitivity classification and (b) a remainder data set.

In another aspect of the invention, the system comprises a server having a processor and connected (including, for example, remotely through a network or internet connection via intermediary servers, routers or end user terminals) to a display device. A computer-readable storage medium is in electronic communication with the processor—the computer-readable storage medium enabled to store ML/AI program instructions for providing content analysis as part of the contextual classification of the data. First, an initial inventory of data set to be categorized is provided to the system. The system is then configured and enabled to implement a library of contextual classifiers (LCCs) comprising (A) a set of predetermined high level sensitivity classification categories and (B) a set of user-generated business-specific sensitivity classifications subordinated one level below the high level sensitivity classifications. Next, the system is enabled to apply the set of predetermined high level sensitivity classification to the initial inventory of data set and identify and remove any redundant, outdated, trivial or abandoned (ROTA) data from the initial inventory of data set to create a reduced data set and a remainder data set—an interactive summary of a reduced data set and a remainder data set displayed on user's display device. The system is then enabled to apply the contextual classifiers to the reduced data set to create a first set of classified data and a second set of unclassified data—the processor further configured and enabled to iteratively apply additional user-generated business-specific sensitivity classifications to the remainder data set of both the first classified data set and the second unclassified data until all data in the reduced data set has been classified in exactly one use-generated business-specific sensitivity classification, thereby accounting for every data (with no other remainder data left to be classified). It is to be noted that the LCCs providing the contextual classification uses rules-based Boolean logic analytics for contextual classification of the initial inventory of the data while ML/AI—based analytics perform cluster and content analysis on the remainder and reduced data sets—the ML/AI proposing or recommending certain topics (and other related things) to ensure that no data is getting overlooked by the system and every data is accounted for within the system.

In another aspect of the invention, a process for contextual categorization of data is provided, the process comprising the steps of: receiving an initial data set to be categorized; establishing a library of contextual classifiers, the library comprising (1) a set of predetermined high level sensitivity classifications, and (2) a set of user-generated business-specific sensitivity classifications subordinated below the high level sensitivity classifications; identifying and removing redundant, outdated, trivial or abandoned (ROTA) data from the initial data set to create a reduced data set and a remainder data set of ROTA data; applying the user-generated business-specific sensitivity classifications to the reduced data set to create a first set of classified data and a second set of unclassified data; and iteratively applying additional user-generated business-specific sensitivity classifications to both the first set of classified data and the second set of unclassified data until all data in the reduced data set has been classified in exactly one use-generated business-specific sensitivity classification. The process may further comprise the step of applying the user-generated business-specific sensitivity classifications to the remainder data set. The process may further comprise the step of utilizing machine learning and artificial intelligence in the applying and iteratively applying steps. The process may further provide that a machine learning module recommends one or more user-generated business-specific sensitivity classifications. The process may further provide that the applying and iteratively applying steps are achieved by reference to the metadata of the reduced data set.

Many other aspects and advantages of the present disclosure are readily apparent from the following detailed description, which illustrates a number of embodiments and implementations. The present disclosure is also capable of other and different embodiments, and its several details can be modified in various respects, all without departing from the spirit and scope of the present disclosure. Accordingly, the drawings and descriptions are to be regarded as illustrative in nature, and not as restrictive.

BRIEF DESCRIPTION OF THE DRAWINGS

The accompanying drawings incorporated in and forming a part of the specification illustrate several aspects of the present disclosure and, together with the description, serve to explain the principles of the disclosure.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE DISCLOSURE

The present disclosure relates to a contextual classification system and method that uses user-specific contextual sensitivity attributes beyond what a machine learning or computer-based algorithm engine can accomplish to create enhanced data management activities to support increased efficiencies.

In an embodiment, the multi-step analytical process to contextually classify may be comprised of: (1) data inventory, for example, capturing a complete inventory of initial data (including any data enrichment via directory services that may involve capturing data ownership or associated business stakeholders); (2) preliminary privacy classifier, known and ROTA analysis based solely on metadata attributes, for example, preliminary classification of any privacy data, or preliminary identification of Redundant, Outdated, Trivial and Abandoned (ROTA) data; (3) contextual classifier, for example, to analyze and contextually classify privacy data, known data, similarity matching and further refined identification of ROTA files for disposal; and (4) cluster analysis, for example, analysis and contextual classification of unknown data, dark data exploration and further refined identification of ROTA data for potential disposal. The process of using a combination of a rules-based and ML/AI classification is enabled to account for and contextually classify all the data, as further disclosed herein.

Figure 1:
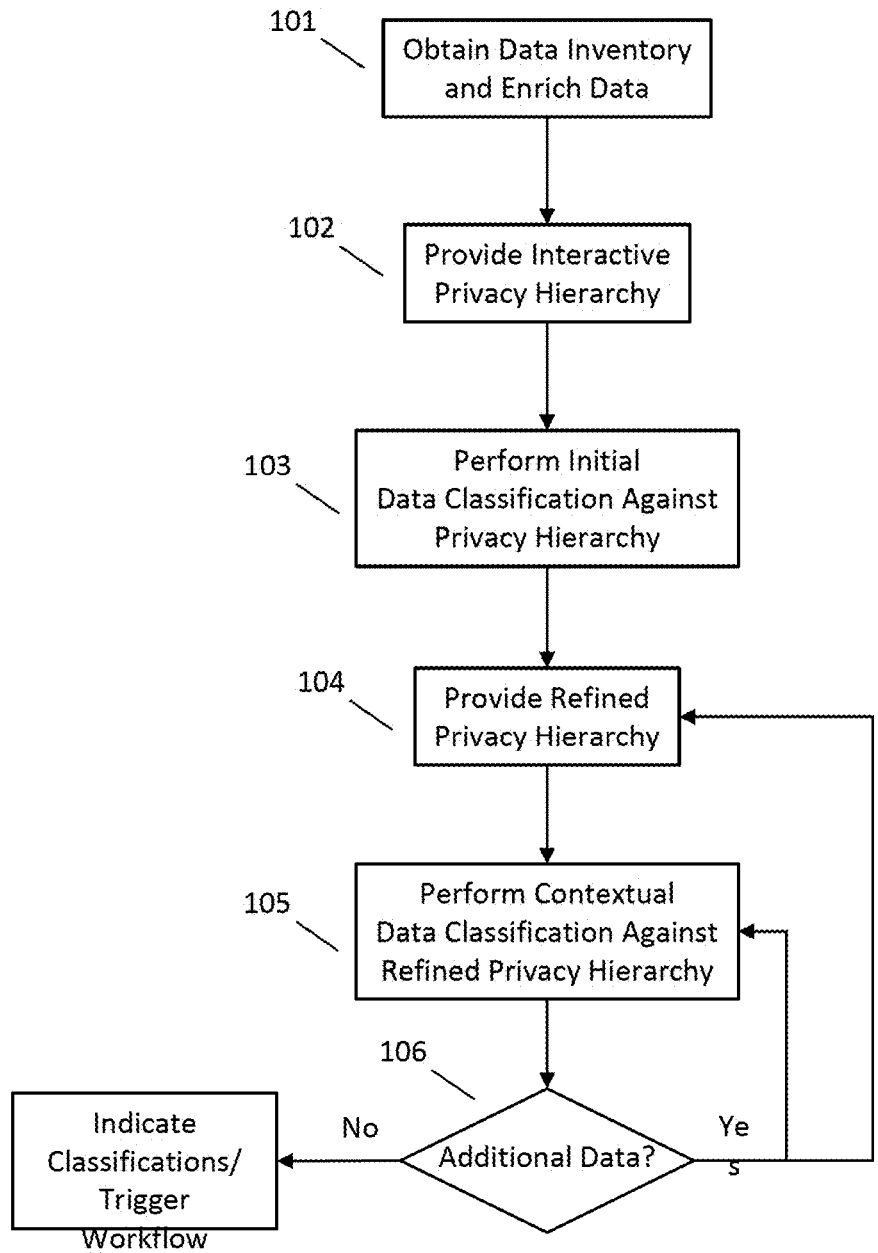
FIG. 1 illustrates the analytical steps of a contextual classification engine.

At a high level, the system and method of an embodiment of the invention comprises a multi-step analytical process to contextually classify, based on user-generated levels of sensitivity, an initial inventory of data received by the system as shown in FIG. 1. As illustrated in FIG. 1, the analytical steps of the contextual classification engine are comprised of obtaining an initial data inventory 101, providing an interactive privacy hierarchy 102, performing a preliminary classification at a high level 103 based on the provided interactive privacy hierarchy, providing a refined privacy hierarchy 104, performing a context-based classification of data 105, and using iterative processing 106 to classify any remaining data.

In the depicted embodiment, the system first receives an initial inventory data set to be categorized and provides data enrichment at 101. In one example, data may be ingested from one or more services via a connector. For instance, a connector library may be provided in a graphical user interface (GUI) to a user such that the user may select the connector for connecting to a data source for ingestion, e.g., via an application programming interface (API) to the data source or service. By way of example and not of limitation, after the user selects a connector, the user is directed to a remote service, e.g., email provider, data streaming service, etc., and asked to input data to login and configure the connector to deliver data to an endpoint accessible by an embodiment. In some examples, a data connector may act to periodically, intermittently or continuously obtain data via the connector for continuous or streaming ingestion of data for classification, which likewise may be used in workflow or robotic process automation processes, as further described herein.

In another embodiment, the process of obtaining a data inventory at 101 may also include automatically enriching the data such as automatically labeling data, e.g., documents, in a data set, e.g., as derived from a connector, with metadata. Further, the process of obtaining a data inventory at step 101 may include data enrichment in the form of applying an automated classification and analytics service to documents to enrich them with metadata labels useful in facilitating the classification, such as based on semantic analysis, sentiment analysis, concept classification, etc., as described herein. In one example, an artificial intelligence service may be used to analyze the data content and label documents in a data set automatically, e.g., based on topic, to facilitate high level or initial classification, e.g., as indicated at step 103 of FIG. 1.

Figure 1A:
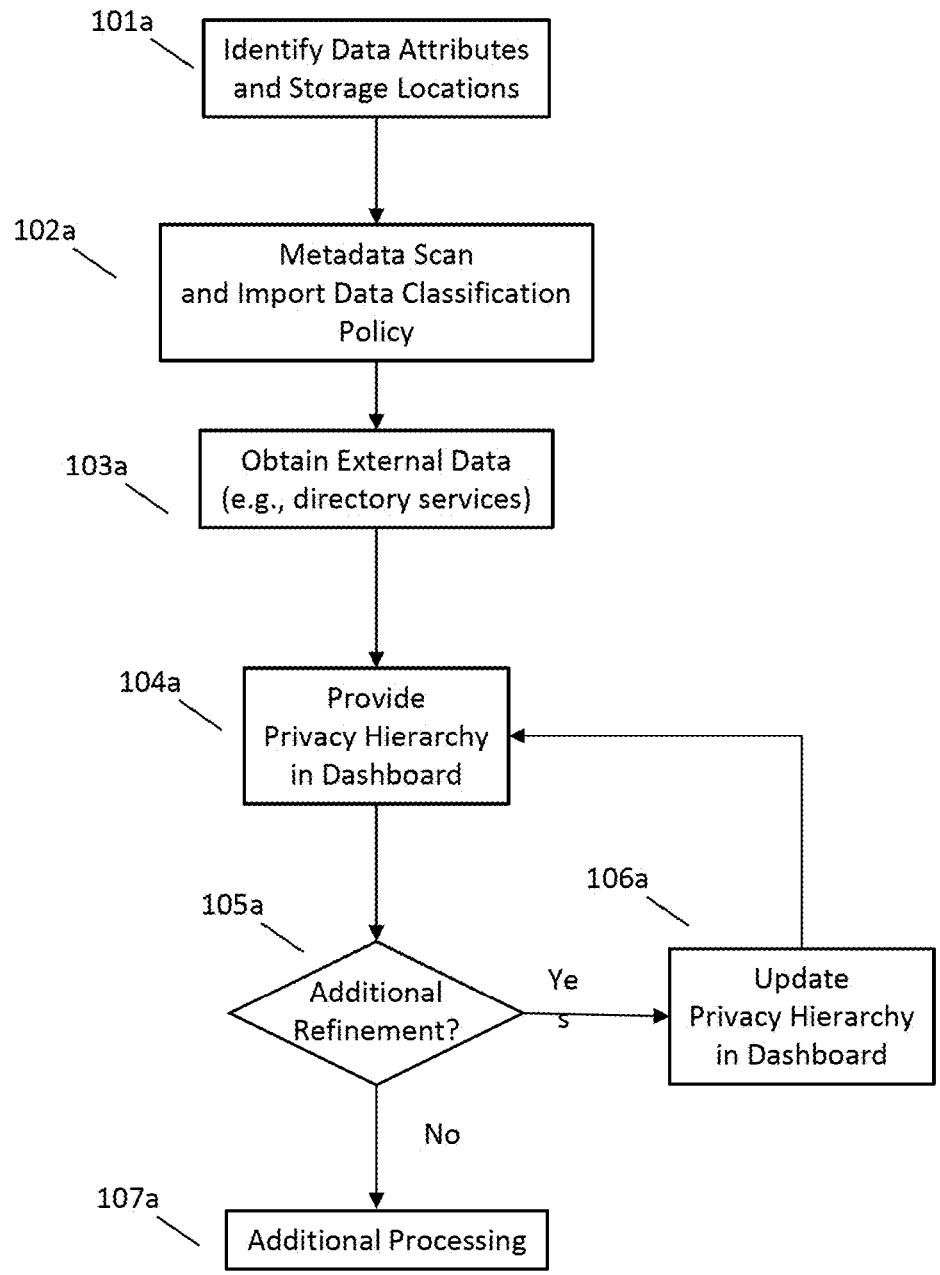
FIG. 1A illustrates further analytical steps of a contextual classification engine.

Referring to the example in FIG. 1A, the process of obtaining a data inventory may include identifying data attributes and storage locations 101a, e.g., in consultation with a data custodian. This permits the system to perform a metadata scan and import data classification policy data 102a, e.g., obtaining predetermined data classification labels as guided by a data custodian indicating files and data attributes of particular interest or relevance. Thereafter, external data may be utilized 103a, for example consultation of directory services data, such as data indicating users or groups of users having access to certain files. This allows the system to provide an initial privacy data hierarchy 104a, e.g., in a dashboard view for a reviewing users such as a data custodian. Thereafter, a user may interact with the dashboard as indicated at 105a to refine the privacy hierarchy 106a or perform additional processing 107a such as reviewing data classifications made using metadata, configuring or triggering workflows using the initial classifications, drilling down into data categories and associated data such as user and group associations, etc.

Referring again to FIG. 1, the system further provides an interactive hierarchy at 102 which corresponds to a library of contextual classifiers (LCCs), the library comprising (i) a set of predetermined high level sensitivity classifications, and (ii) a set of user-generated context-specific sensitivity classifications, subordinated one or more levels below the high level sensitivity classifications. Once an initial inventory of data is obtained by the system at 101, an example process is configured to perform an initial data classification or pre-classification using privacy data in the documents of the data inventory, as indicated at 103. By way of example and not of limitation, the system may read and analyze the various data fields to perform the initial classification (e.g., pulling all the table schemas of the data to review what fields are the same/different in each of the tables). For instance, if Social Security numbers (SSNs) are residing in the various fields of tables in documents, the process at this stage is configured and enabled to review whether the data consist of the entire SSN or a partial SSN. The system therefore may perform pre-classification of privacy data from the initial data inventory at 103.

The contextual classification system disclosed herein is not just connecting to a data inventory, but rather is connected to other system(s), e.g., access control systems such as an active directory (e.g., GOOGLE directory) so that the system is configured to enrich data, as indicated at 101, e.g., understand what divisions of a business or users or departments are accessing the data (or have access to the data). The system disclosed herein thereby captures the information on the data owners or the data stakeholders for the initial inventory or set of data—the system configured to intelligently using the data that is readily available and then correlating the data with directory services, thereby bringing the data to life and making the data more contextual for a particular classification scheme. One aspect of contextual classification is the initial step of capturing the data inventory and correlating the data with active directory services at 101 such that the data of the inventory may be contextually classified based on user-generated contextual sensitivity classifications, as indicated at 104. This processing allows the system iteratively determine what data from the initial inventory of data should move for further processing, e.g., to a more refined contextually relevant sub-category, and where it should go based on what the data is used for, i.e., the basis of the user-generated contextual sensitivity classifiers, rather than simply what the data is, which is a generic parameter of the data not unique to a particular context and therefore has no inherent relation to a context-specific sensitivity classification.

Figure 2:
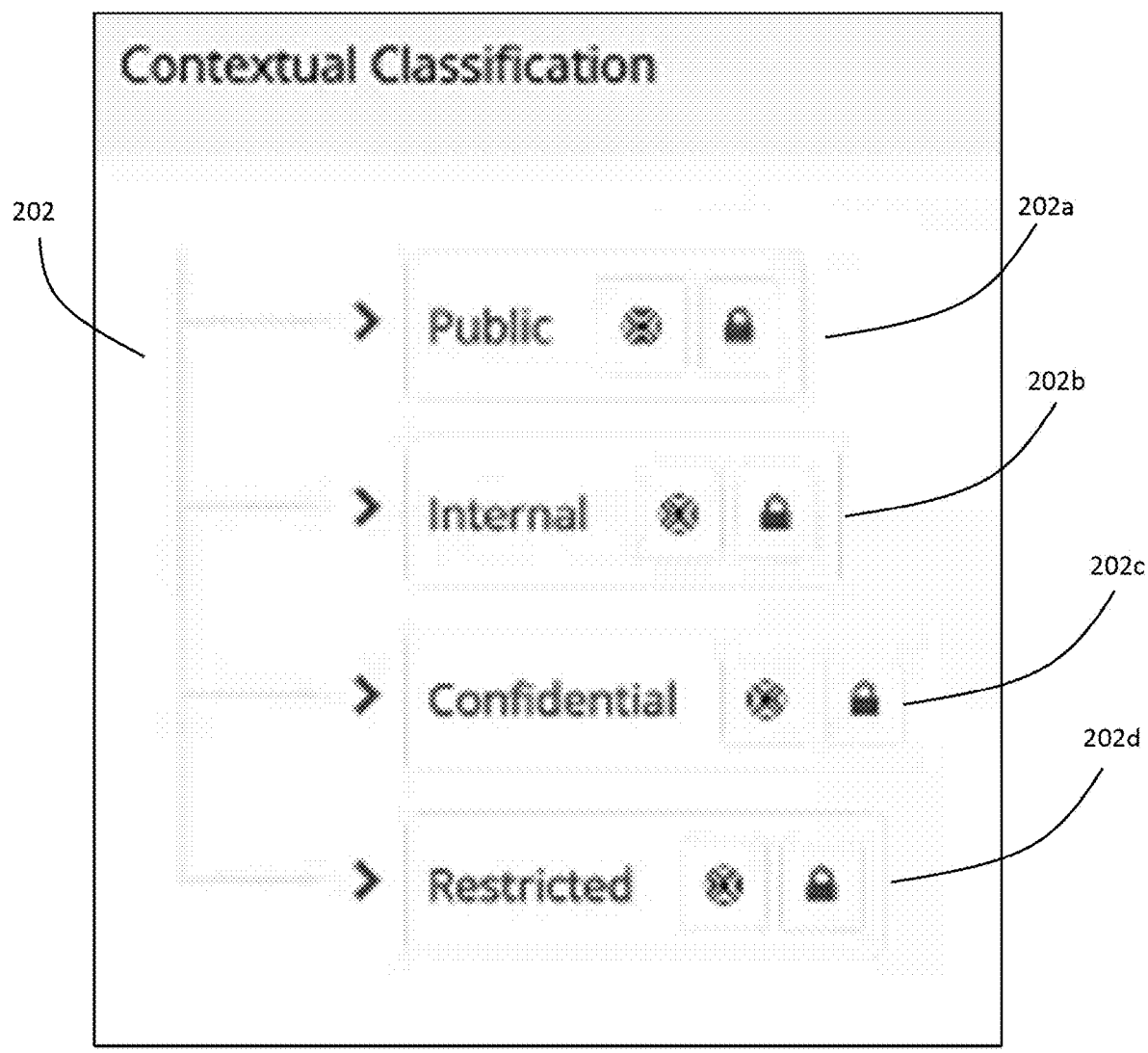
FIG. 2 provides an example of a high level classification of the data.

In another embodiment, the system uses LCCs comprising (1) a set of predetermined high level sensitivity classification, and (2) a set of user-generated business-specific sensitivity classifications subordinated below the high level sensitivity classifications. First, as part of the initial data classification at 103, the system is enabled to apply the set of predetermined high level sensitivity classification to the initial inventory of data set and identify and remove any Redundant, Outdated, Trivial or Abandoned (ROTA) data from the initial inventory of data set, e.g., using metadata such as redundant file paths, file names, etc., thereby creating a reduced data set for further classification and a remainder data set of the ROTA-segregated data. In some embodiments, an interactive summary of the reduced data set and remainder data set are displayed on user's display device in connection with obtaining user input at 104 to form a refined privacy hierarchy, e.g., adding one or more subcategories to a previous privacy hierarchy. In the depicted embodiment, the high level sensitivity classification uses a privacy hierarchy 202 (of the LCCs), for example, based on an organizational policy, that categorizes and contextually classifies the data into: (1) Public 202a, (2) Internal 202b, (3) Confidential 202c and (4) Restricted 202d, as shown in FIG. 2.

Referring again to FIG. 1, the high level sensitivity classification of the data can be further categorized and/or classified by applying the user-generated contextual sensitivity classifiers, e.g., as indicated at 104 of FIG. 1, to the reduced data set to create a first set of contextually classified data and a second set of unclassified data at 105. The data at this stage is contextually classified, depending on the specific context sensitivity of the data as indicated by the user by the subordinated user-generated context-specific sensitivity classifications, as indicated at 104. For instance, confidential data based on the high level sensitivity classification hierarchy applied at 103 can be further categorized and classified at 104 on the basis of the target of the confidentiality (data confidential to whom and on what basis). The system disclosed herein is enabled to tell the user a story about specific categories of data. This is an improvement over conventional classification systems, which simply identify a datum (such as a document or executable program file) as confidential 202c but cannot identify what part(s) of a business to which the confidential datum relates. The present disclosure provides a solution to generic categorizations of huge amounts of data based on the high level, but agnostic to the context of the confidentiality.

Figure 3:
FIG. 3 provides an example of detailed contextual classification of the data.

The system disclosed herein can contextually classify the data into sub-categories that are contextually relevant, e.g., as indicated by the user at 104 of FIG. 1. For instance and as illustrated in FIG. 3, confidential data indicated at 302 can be further contextually classified into confidentiality sub-categories based on context specific data, e.g., as it relates to an organization's directory services. A user may indicate confidential data sub-categories (collectively indicated at 304) as related to organizational groups via association with access control lists controlling access to data relating to specific claims, sales, agreements, complaints, non-critical IP, legal documents, privacy data or personally identifiable information, etc.

Figure 4:
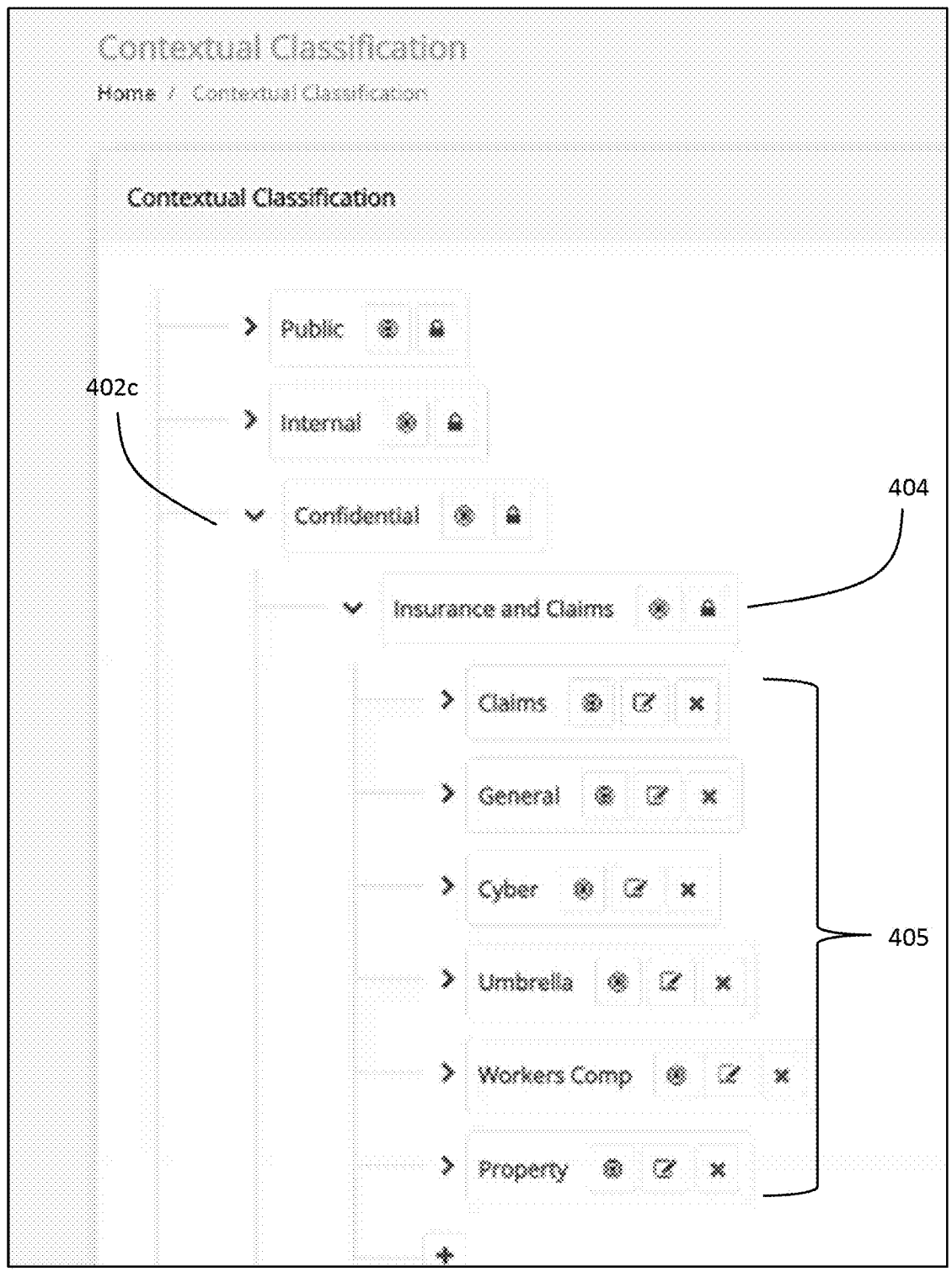
FIG. 4 illustrates a dashboard for adding new data sources and data guardians for contextual classification of the data.

In addition, more than one refined hierarchy may be used, e.g., as provided by interactive input of the user, as illustrated in FIG. 4. The rules-based innovative process and methodology of the present disclosure working in conjunction with computer processing of data can further contextually classify the data in a way that current computer-implemented ML/AI systems are unable to do. For instance, confidential data 402c classified under insurance and claims 404 can be further categorized and classified into additional user-specified categories (collectively indicated at 405), such as claims, general, cyber, umbrella, workers' comp, property, etc., that are user-generated based on specific context and sensitivity. Such enablement of the system permits the user—for example, an organizational data custodian with domain-specific knowledge of the initial data inventory, the organizational structure, the privacy and access policies, etc., to further provide information for classification into context-specific sub-categories that are relevant to the organization or to the data classification task at hand, e.g., classifying confidential data not simply based on its data content, but using metadata that indicates who can access certain data and for what purpose at a level far superior to conventional computer-implemented solutions.

As further illustrated in FIGS. 1-3, the system and processes permit an interactive user interface for generating data classification models based on privacy hierarchies. In the depicted embodiment, the contextually classified data at each level of classification can be easily customized by a user not experienced with classification modelling. For example, the user may prefer hierarchies that are directed to different departments or business units and/or to different stakeholders. In particular, the "Insurance and Claims" classification 404 may be insufficient on its own to create effective and specific contextual sensitivity control over the data.

The system disclosed herein and as illustrated in FIG. 4 can further use sub-categories to refine access to confidential data based on an organizational context. By way of specific example and not of limitation, sub-categories 405 such as Workers' Camp may be used to restrict access to confidential data to those users within the organization that are related to the Human Resources department, as indicated by directory services metadata such as an access control list or identity and access management system data. Similarly, sub-category Property is related to confidential data for the facilities managers, while employees responsible for Cyber confidential data would typically have no purpose to have access to either Workers' Comp or Property, but solely to sub-category Cyber.

By enabling user-generated specific contextual sensitivity classifications using metadata, the system goes beyond what is capable with ordinary and conventional ML/AI-based systems that supply classifications using document content—such systems often being devoid of organizational contexts. The system disclosed herein allows the contextual classification at the metadata level without actually looking into the internal details of the files, speeding up the data processing as well as the model design and training phases. These features reduce and filter the data at each level of the analysis, enabling classification of the data based on whether it is, for example, a "confidential-contract," "confidential-tax documents" or related to other categories of confidential documents. Classifying the data at this level of classification allows the user to understand what type of data the user is dealing with and what specific concerns (if any) the user might have regarding the particular data, as shown in FIG. 5.

Figure 5:
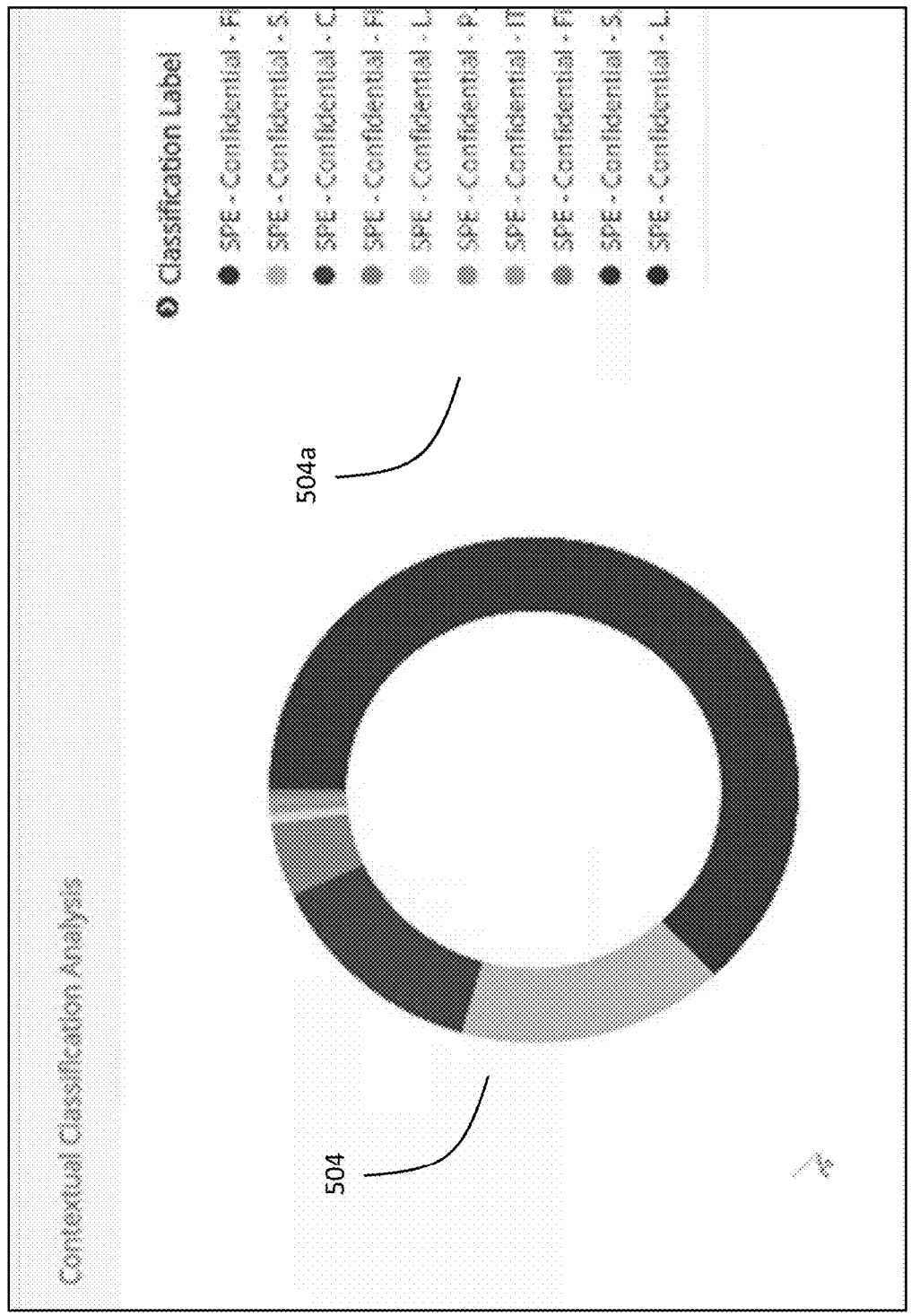
FIG. 5 illustrates the contextual classification engine classifying the data based on type of data.

Referring to the example of FIG. 5, a graphic display 504, 504a may be provided by the system to display the relative number of documents in each category and sub-category. In one example, the graphic display 504, 504a is interactive, e.g., a user may interface with graphic 504 or graphic 504a to obtain additional or different data, such as reviewing the underlying documents associated with the category or subcategory, the model(s) used to classify the documents into the category or subcategory, etc. In the depicted embodiment, the steps 103 and 105 performed by the contextual classification system primarily use metadata scanning of the initial inventory of the data and application of rules-based classification models. In one example, the system may provide an interactive interface for specifying or modifying the rules used by a classification model such that it interacts with and uses metadata to classify documents per user requirements. By way of example and not of limitation, the system may use non-ML/AI rules-based analytics based on Boolean logic to provide contextual classification, as shown in FIG. 6.

Figure 6:
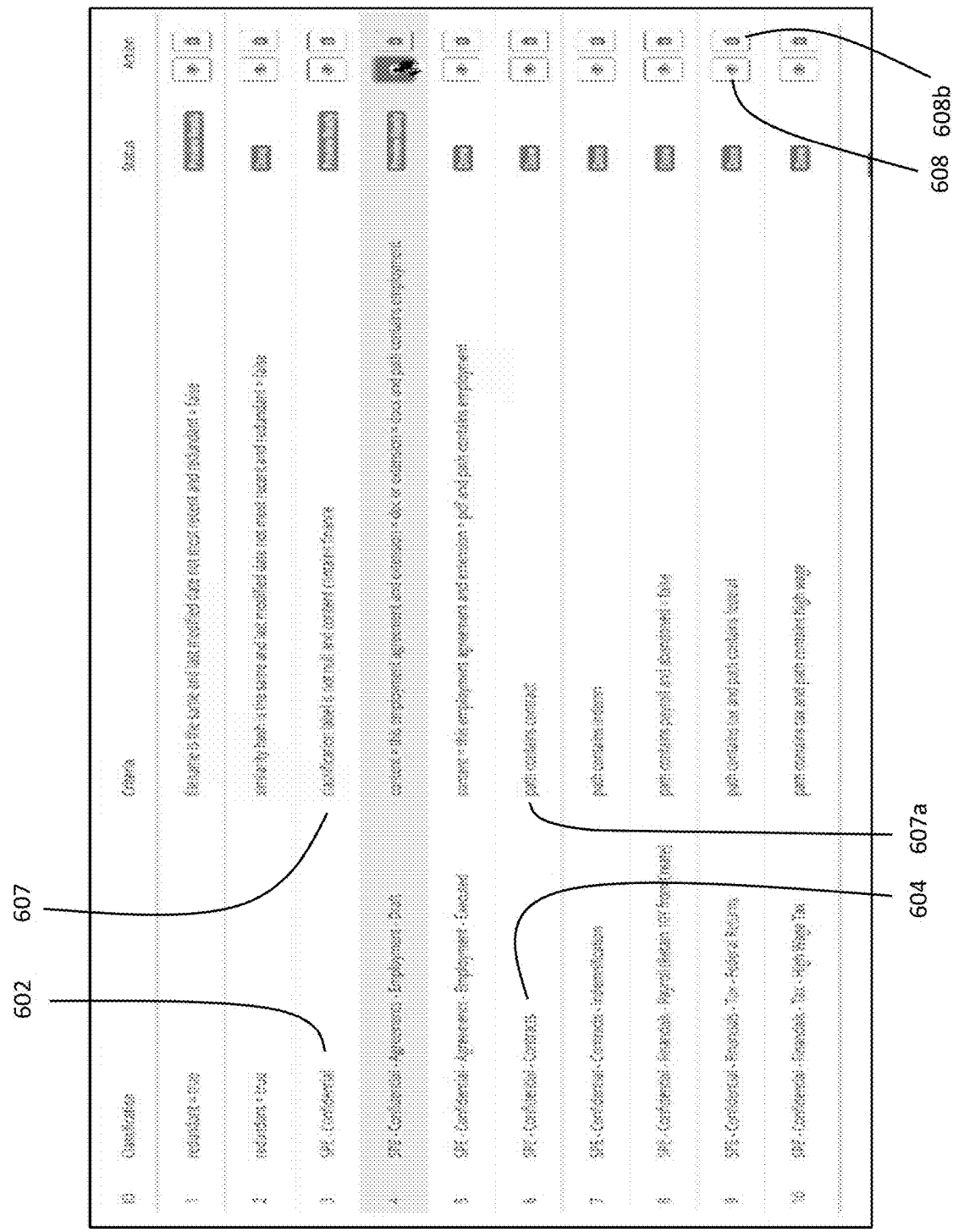
FIG. 6 illustrates the contextual classification engine applying the rules-based classification model.

As further illustrated in FIG. 6, the system provides a display of the categories, one of which is indicated at 602 ("confidential"), and the corresponding classification rule indicated at 607 ("classification label is not null and content contains finance"), used to classify the documents. Similarly, the system displays sub-categories, one of which is indicated at 604 ("confidential contracts"), and associated metadata rules, one of which is indicated at 607a ("path contains contract"). It can be appreciated that high level privacy categories, e.g., confidential 602, as well as context-specific sub-categories, e.g., confidential contracts 604, are being used for contextual classification. The system has applied classification rules 607, 607a to classify documents into the category and subcategory, respectively.

The system disclosed herein is able to utilize a hybrid approach, i.e., utilize content-based classification rules (e.g., content contains keyword "finance") for categorizing data at a high level, which may be automated, as well as utilizing context-specific classification into sub-categories based on metadata rules (e.g., privacy label is not null or file path contains keyword "contract").

In another embodiment, a user such as a data custodian is empowered to create such content-based and metadata-based rules for classifying documents. As with other displays provided by the system, the display of FIG. 6 is interactive, e.g., a user may interface with elements of the display, such as icons 608a and 608b, e.g., to perform related actions, such as triggering an automated or semi-automated workflow, implementing a robotic process automation, etc. For example, a user may interface with a GUI element such as elements 608a and 608b to view the underlying documents or a summary thereof, delete associated documents of a category or sub-category, create an archive of associated documents, apply corresponding metadata labels, encrypt associated documents, create an automated workflow for sending a notification to a user, etc.

In another embodiment, user interaction may trigger downstream automated actions, such as sending a notification to a specified endpoint or user account, etc. In other examples, documents of a data classification category may be subject to automated processing using robotic process automation, such as automatically encrypting the content, submitting it for analysis by an AI/ML model for cognitive summarization, etc. In examples where the data inventory source is a streaming service, these automated actions may be ongoing, e.g., performed as one or more documents are classified to a category or subcategory per user configuration of a workflow or automated process.

As may be appreciated, the ability to better understand the nature of the data in the initial inventory of data allows for more accurate handling of the data with confidence. In one example, a workflow, such as indicated in FIG. 1, may include using data derived from the classifications, such as an amount or type of data indicated as private data based on its use within a specific organizational context, to influence a data governance risk score. By way of specific example, a data governance risk score may be calculated based on data criticality, threat probability, and vulnerability rating, as tempered by any mitigation (e.g., security or protective measure). A data governance risk model may be tuned using more accurate input offered via more precise data classification, e.g., a more accurate input score for data criticality in context results in a more accurate data risk governance score. As a specific example, a data classification performed by the system in consultation with directory services metadata may indicate that although a specific type of data (e.g., file) is stored in a secure location (e.g., encrypted drive), directory services data (e.g., user or group permissions) indicates that this type of data both includes private or confidential data (is critical) and is at greater risk contextually based on users or groups of users that currently have access to it. Therefore, the contextual data classification(s) made by the system may be provided to data risk governance scoring models to adjust or modify the data risk scoring, which may be displayed to an end user, e.g., on a periodic, intermittent or continuous basis.

Similarly, the data derived from the contextual classifications may be provided to other services, such as a service that associates data criticality to users or groups of users in an organization, e.g., allowing an end user such as a manager to understand which users or groups of users (e.g., employees, contractors, etc.) may need to be further trained on handling sensitive data based on their ability to access the data. Further, such data may be used to influence alerts, notifications or indications related to data security, such as alerting an end user that one or more particular users have accessed data classified as critical in an unusual manner, e.g., from an unauthorized IP address, at unusual times, from an unexpected location, etc.

In a similar manner, many other tasks that are reliant on accurate, contextual data classification may be facilitated. In one example, data migration tasks may be facilitated by more accurately classifying which data is critical or useful to an organization and should be migrated, whereas other data (which may be redundant) does not need to be. This materially reduces the amount of data that needs to be migrated and reduces overall system resource usage (e.g., processing time, storage amount).

Figure 7:
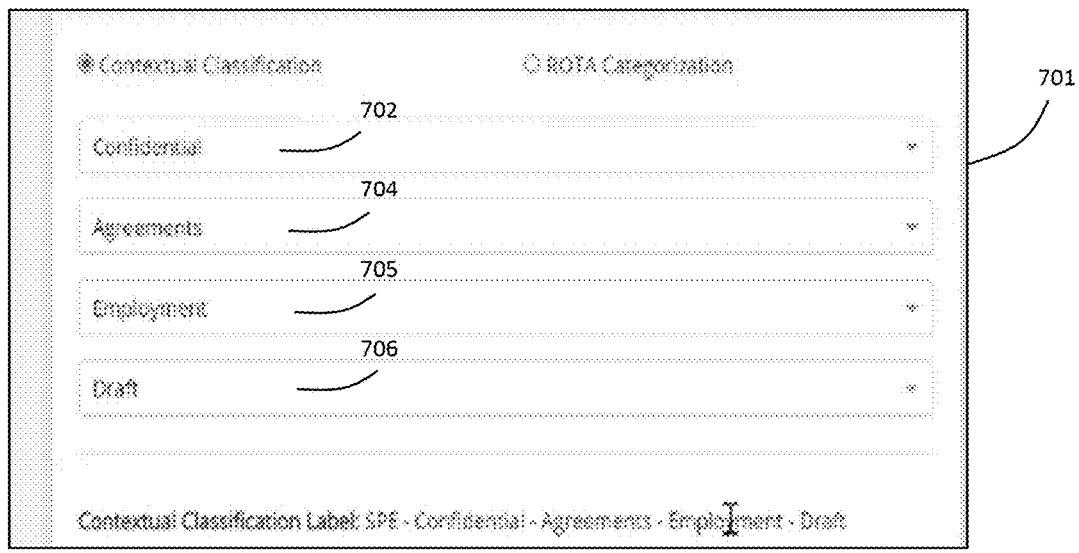
FIGS. 7 and 7A illustrates the graphical user interface (GUI) provided by the contextual classification engine.

In another embodiment, a rule-based process and methodology based on Boolean logic enables the user to define new rules for contextual classification of the data. For example, as shown in the example of FIG. 7, the system provides a tool such as a graphical user interface (GUI) 701 with drop down options 702-706 for a user to define a rule to capture and contextually classify documents within a sub-category, such as certain confidential (high level category supplied by the system or an administrator input or configuration) employment agreements (a subcategory type of confidential document) that are in draft mode (a further subcategory of the employment agreements category). The options displayed by the GUI 701 may correspond to categories and sub-categories of a hierarchy, e.g., as indicated in FIG. 4. As may be appreciated, depending on the amount of detail supplied to the hierarchy, the user can further modify the Boolean-based rules to capture and contextually classify documents into very refined categories as needed, e.g., into confidential employment agreements, in draft mode, and accessible by a certain user group and/or that have already been executed by certain parties, e.g., as indicated by electronic signature metadata. The system is enabled to give the option to users to specifically select documents using particular metadata available to the system, e.g., based on file system information such as documents with certain kind of file extension(s) (.doc or .docx or .pdf). As in the example of FIG. 7, the system allows the user to combine metadata-based rules (via selection of options 704-706) with content-based rules (via selection of option 702) to target a specific classification type.

Figure 7A:

In the example of FIG. 7A, an embodiment of the system provides a rule-building tool 701$a$ in the form of a GUI that presents options, collectively indicated at 700$a$, for building rule-based logic for metadata and/or content-based classification of documents. In the depicted embodiment (and as illustrated in FIG. 7A) the system provides a tool for creating a rules-based process and methodology to make the user the primary decision maker for contextually classifying the data without actually telling the user how to classify the data, i.e., the end user is not confined to pre-trained and complex AI models that may not be able to classify the data according to the end user's particular needs. Further, the system presents within the options 700$a$ metadata-based rules that allow the system to more quickly process large amounts of documents for classification, needing to only process the metadata associated with the documents in many cases.

In another embodiment, the system provides the appropriate business intelligence about the data to the user—telling the user that there are certain kinds of data that the user probably doesn't know exists—providing proactive identification and lifecycle management of data to support critical functions. For example, the system may automatically present various options 700$a$, e.g., in the form of drop-down selections 702-704, based on the system's analysis of available metadata relevant to the data inventory. As described, this may include metadata available from external systems, such as a directory service, which includes access control information, such as users and groups that have access to specific documents, storage locations associated with documents, etc.

The system disclosed herein may be utilized for complete classification of the initial data inventory. For example, the system starts with 100% of the initial data and after every level of analysis per the privacy hierarchy, the system reduces and filters the data down into smaller and smaller reduced data sets until it reaches the point at which all of the data is accounted for and contextually classified, with each datum in only one category, and without any catch-all categories such as "miscellaneous" or "other." Because the data is classified based on what it is used for rather than what it is, each classified datum will have a classification to which it belongs. Data that have no use are segregated into the ROTA remainder set rather than maintained in a useless "other" or "miscellaneous" classification that fails to identify the use of the data.

In another embodiment, the system is configured and enabled to run content-based contextual sensitivity classification analysis and contextual classification of documents such as documents containing privacy data. The system may use similarity matching and further refined identification of ROTA files for disposal and cluster analysis to accomplish analysis and contextual classification of unknown data, perform dark data exploration and further refined identification of ROTA data for potential disposal, as further described herein. During these steps, the system is configured to look inside the data files and review and analyze the contents inside the data, for example to highlight attributes related to the document contents, as shown in FIG. 8.

Figure 8:
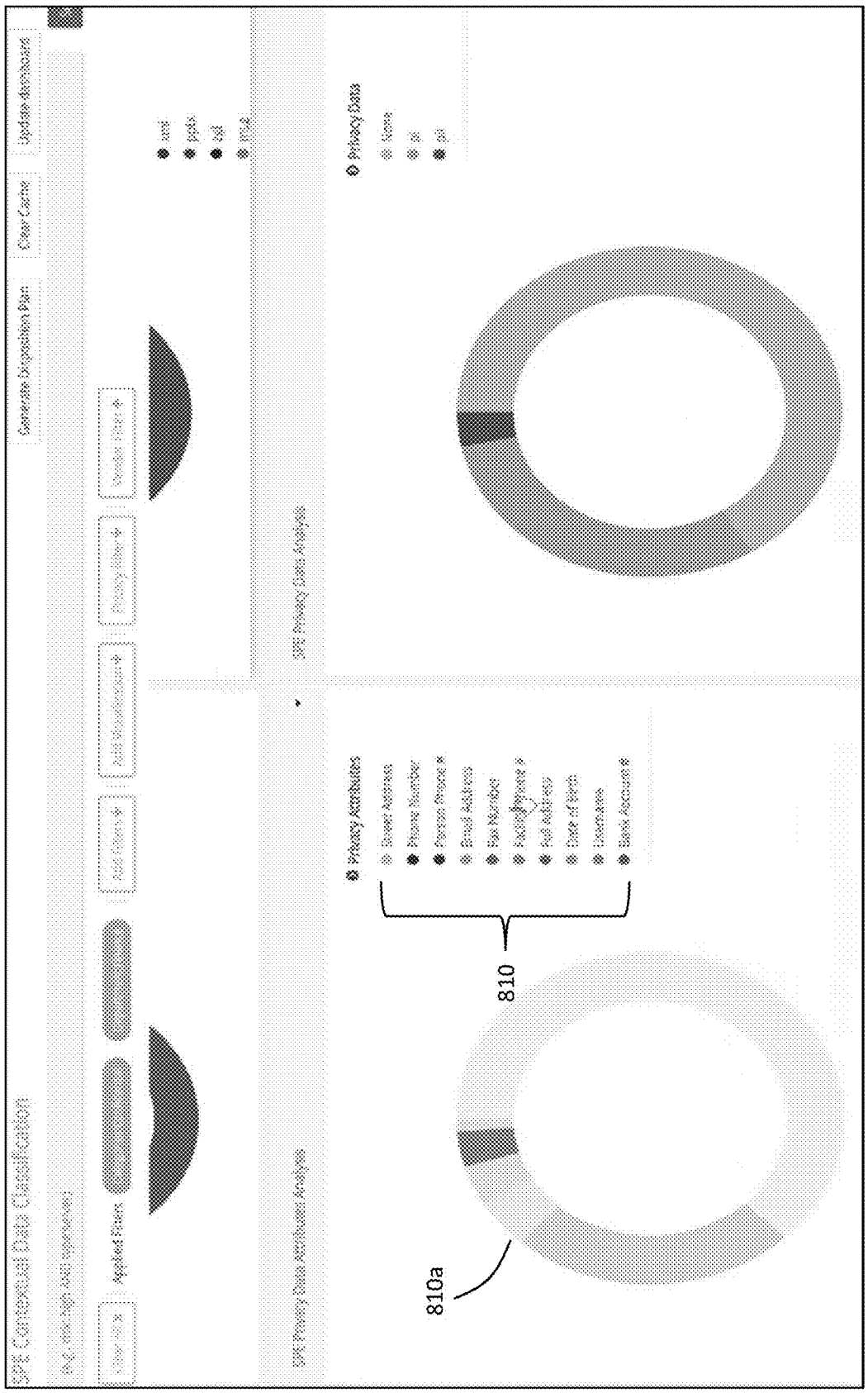
FIG. 8 illustrates an example of a content-based analysis of documents within the contextual classification engine.

As illustrated in FIG. 8, an embodiment applies a content-based analysis to documents within a category or subcategory, e.g., the initial data inventory, a category thereof, a subcategory, unclassified data, etc. The content-based analysis may include use of a pretrained model to identify data of interest, such as privacy data in the example of FIG. 8. As illustrated, an embodiment analyzes the content to identify privacy data of a certain type, such as street address, phone number, email address, bank account, etc. The identified privacy data for an associated document may be labeled or tagged with a privacy attribute, for example, corresponding to the privacy data categories detected by a model of the system, as indicated at 810 of FIG. 8. Other graphics may be provided, e.g., a percentage overview graphic 810$a$ indicating the number of documents including privacy data of the type. As with other displays, the display of FIG. 8 may be interactive, e.g., responsive to user input to graphic 810$a$ to display documents associated with the privacy attribute, displaying the category or sub category associated with the documents containing the privacy attribute (e.g., confidential employee agreement, confidential contract, etc.), showing further data attributes or metadata associated with documents of the set, or the like. This assists the end user with understanding the content-based nature of the documents assigned or classified to a particular category or subcategory.

Embodiments provide one or more GUIs that present a visual representation of the classified data. Such interfaces enable the analysis and contextual classification of privacy data, known data, as well as similarity matching and further refined identification of ROTA files for disposal, allowing the user to scan and review the inside contents of the data files (e.g., invoices to be paid, etc.). For instance, the user can look inside the files and find content such as the various privacy attributes of the classified data generated by the system, e.g., privacy attributes 810 such as bank account, date of birth, email addresses, phone numbers, street addresses, etc. The contextual classification of the data at this level can provide recognition for any additional ROTA data (e.g., notifying the user of certain types of redundant data disbursed in multiple different repositories associated with categories or sub-categories).

Embodiments may provide a GUI to display and enable further document-based intelligence to the user, for instance, by giving the user an understanding of the kind of data attributes provided by the user-generated specific contextual sensitivity classification system (such as whether the data classification results are providing credit card information, Social Security numbers, or some other attributes and the reason for capturing such data attributes by the system). For instance, embodiments of interfaces encompassed within the present disclosure can provide, for example: (a) the number of data files (out of the large inventory of data set) classified as showing a certain privacy attribute (e.g., a SSN); (b) high level sensitivity classification of the data (confidential privacy); (c) who owns the classified data (e.g., data is owned primarily by risk management with some overlap with legal); and (d) what other attributes are also residing in the classified data (street address, phone numbers, etc.).

In another embodiment, the system is further enabled to provide contextual classification information at a granular level. If a certain attribute about a piece of data is already known (e.g., name and/or SSN), the system can provide other contextual data-related information on that particular piece of data, for instance, how many files within the data inventory have the same name and/or SSN attributes as well as the ownership of the data. Intelligent and machine learning systems therefore enhance and may be used in conjunction with the user-generated specific contextual sensitivity classifications to connect the dots and links within the contextual classification engine for each piece of data.

Embodiments include automated analyses such as a cluster analysis, which may be utilized at a stage where rule-based analysis and contextual classification of the initial and subsequently reduced data sets leaves data unclassified or indicated as ROTA data. For example, in evaluating unknown data, performing dark data exploration and further refined identification of ROTA data for potential disposal, an embodiment may utilize automated models and document processing techniques such as cluster analysis to group documents based on similarity (e.g., textual similarity) to allow the user to analyze these documents. By way of example and not of limitation, the system provides the end user with an indication of the data owner of such documents to assist in classifying the remaining documents, as shown in FIGS. 9 through 9C, which provide a series of displays presented by an embodiment in response to user interaction.

Figure 9:
FIGS. 9 through 9C illustrate an example of a content-based analysis of documents within the contextual classification engine.
Figure 9A:
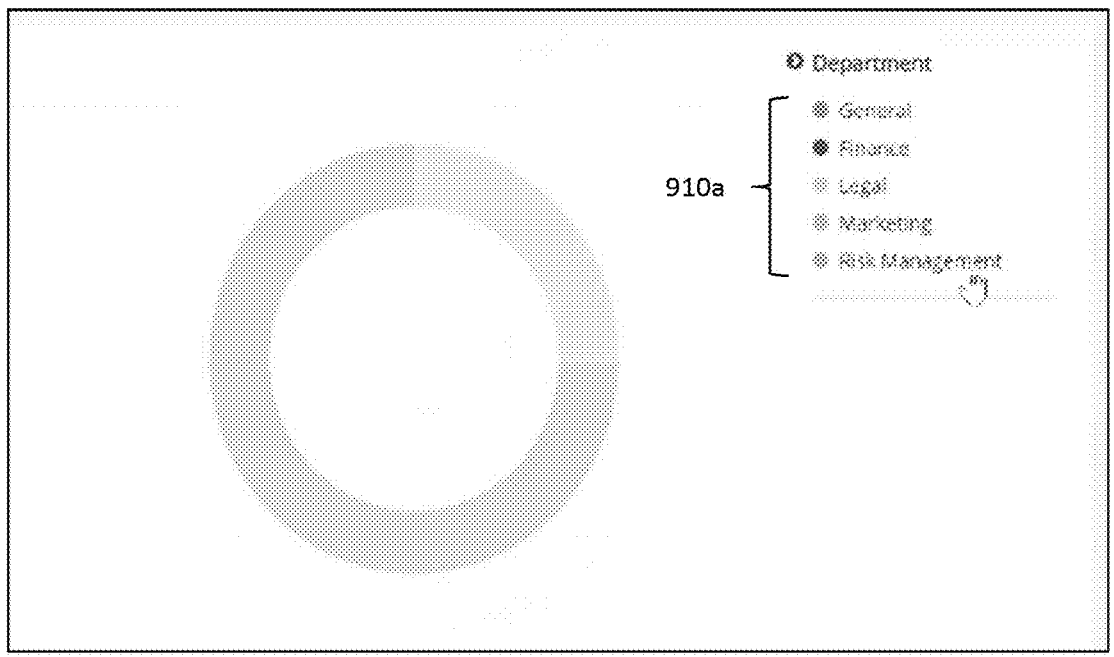
Figure 9B:
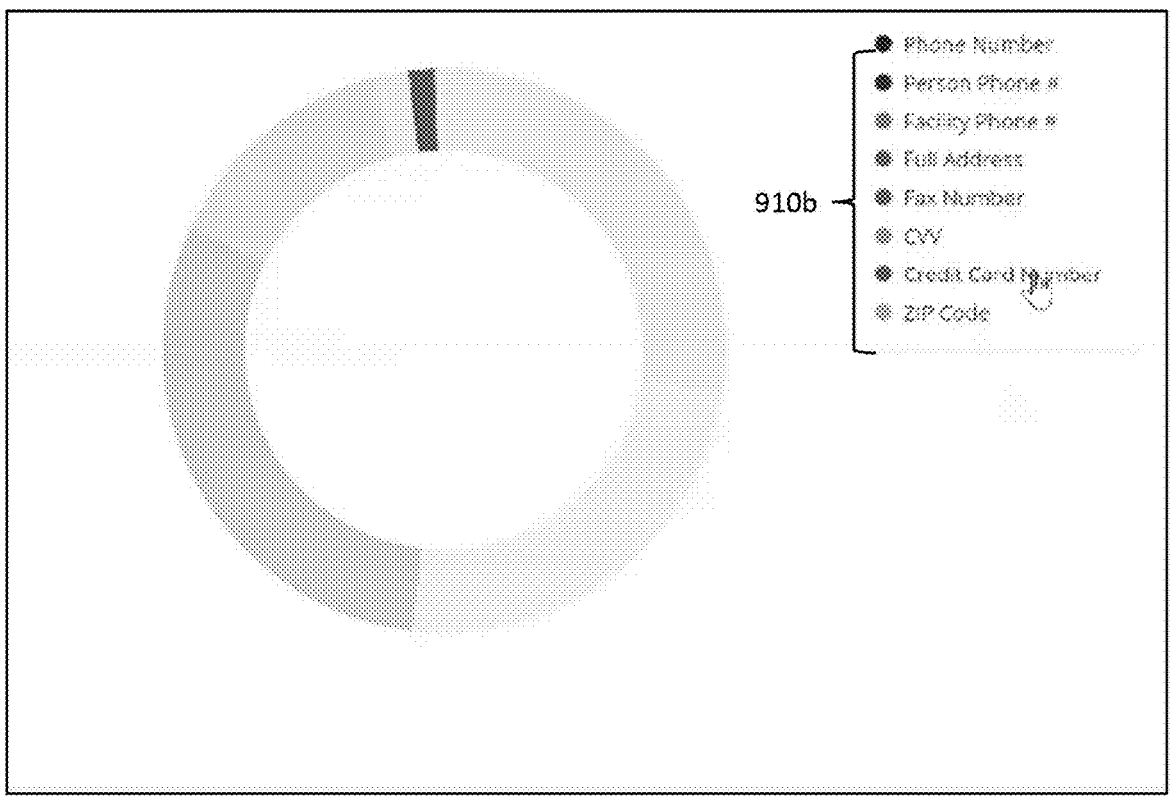
Figure 9C:
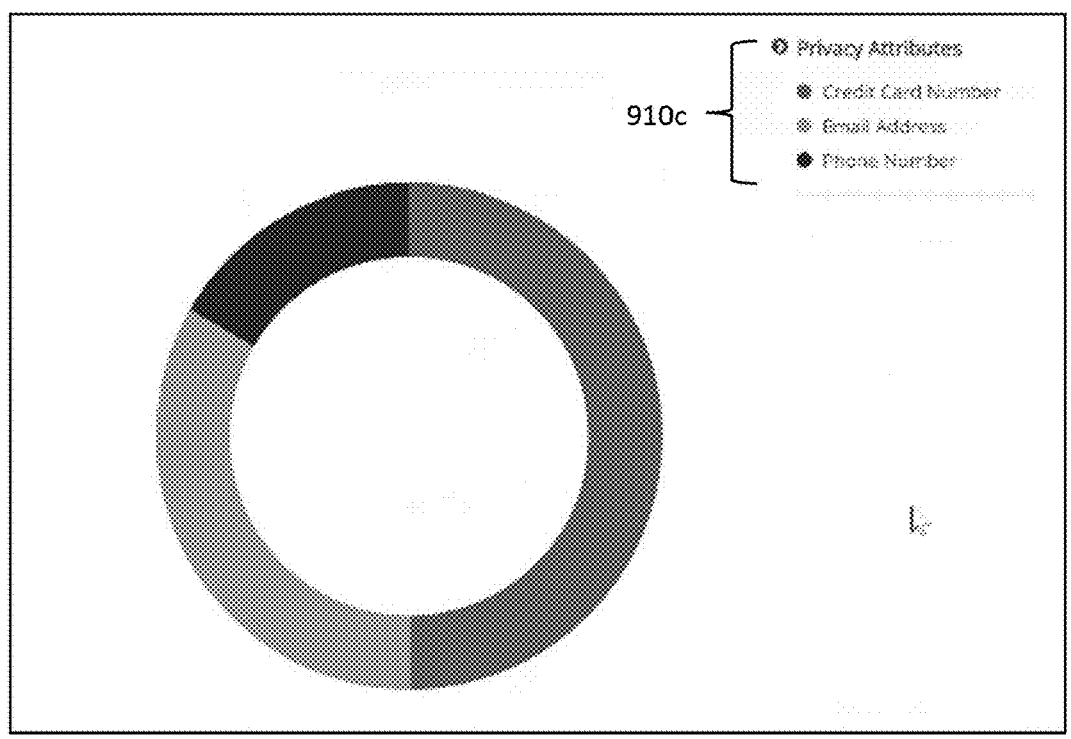

Referring back to FIG. 1, and using the example of FIGS. 9 through 9C, a user may proceed through steps 101-106 and be left with data that is yet unclassified per the privacy hierarchy and/or refined privacy hierarchy, as indicated at 106. This data may be displayed 107 as indicated at FIG. 9, i.e., all or nearly all of the documents in the set are unclassified, as indicated at 910. The system may, nonetheless, assist the user in further classifying the data or at least understanding the nature of the contents thereof. As illustrated in FIG. 9, a user may provide an indication to the system that the unclassified documents are to be analyzed and/or that the user wishes to see data attributes of the unclassified documents (if the documents in the unclassified set have already been analyzed by the system).

In another embodiment, the type of analysis performed on the unclassified documents may be dependent on the context, the system configuration, user preferences, etc. For example, an embodiment may provide options for selecting a model or analysis technique to apply to the unclassified documents, e.g., identify data ownership of the documents using document or external system metadata followed by content extraction for privacy attributes of interest. Additionally or alternatively, the system may automatically apply one or more preconfigured analysis models to the data. In addition, as shown in the example of FIG. 9A, the system may therefore present the user with an interactive listing of attributes 910a related to the documents, e.g., data ownership indications for the documents based on file system and access control metadata. As shown in FIG. 9B, the user may interact with the display of data attributes of FIG. 9A to further analyze a particular set of documents having a particular attribute, e.g., documents tagged or labeled by the system as related to a risk management organizational unit via association with system metadata may be selectively presented as in FIG. 9B along with corresponding data attributes 910b for the selected dataset. In FIG. 9B, the system presents data attributes 910b of the data set selected in FIG. 9A, i.e., risk management. Here, data attributes 910b provide the end user with further information related to the refined data set, in this example indications of privacy information found within the files, e.g., using a model trained to identify such content in the documents. As may be appreciated, the system may continue to allow the user to drill down into subsets of the documents to discover different data attributes, e.g., as shown in FIG. 9C where privacy attributes 910c of documents containing credit card information (selected from FIG. 9B) are displayed. As may be appreciated, this provides the end user with refined information related to the documents in a given set or subset, and permits the user to make decisions regarding the documents, e.g., apply a classification thereto (e.g., manually), discard the documents as ROTA, archive the documents with a given label or tag, query a user or user group associated with the documents via data ownership metadata, trigger a semi-automated workflow, etc.

Referring again to FIG. 1, the system is enabled to iteratively apply user-generated specific sensitivity classifications to the initial data inventory or a preliminary classification thereof as well as the remainder set of both the first set of classified data and the second set of unclassified data at steps 103-106 until all data in the reduced data set has been classified in exactly one use-generated specific sensitivity classification (with no other remaining data left for contextual classification). The applying and iteratively applying steps are typically achieved by reference to the metadata of the reduced data set rather than needing to analyze the content of the documents, which speeds system performance when attempting to classify a document inventory that is terabyte or petabyte in size, for example. It is to be noted that the system disclosed herein can continuously, intermittently, periodically and iteratively apply the user-generated specific sensitivity classifications to the remainder data set until the entire data set is appropriately and contextually classified.

The system and method disclosed herein use data attributes from a variety of sources to enhance data management activities in support of increased efficiencies. The user-based system comprises at least one server operatively connected to a processor, a display device, a memory in electronic communication with the processor, and instructions (including, in some embodiments, instructions based on AI or ML/AI, such as trained neural nets for classifying or extracting specific data, or application programming interfaces (APIs) to call model services offered by external or operatively connected systems)—executed by the processor to iteratively apply contextual sensitivity classification to the data as described herein, as well as for analysis and contextual classification of remainder data, if any. For instance, if a certain data requires further analysis (e.g., privacy data), ML/AI can be enabled to perform any privacy analytics at the content level of the classified data. The present disclosure can be combined with various existing tools of "cluster analysis," such as used to produce "word clouds," to give the system topics, entities or concepts for content analysis of the data at desired steps of the inventive contextual sensitivity classification.

In another embodiment, the system and method of contextual classification is configured to iteratively apply user-generated specific sensitivity classifications to the remainder data set. In the described example embodiments, the system and method is enabled to utilize ML and AI in the iterative applying steps. The ML/AI is further enabled to provide recommendations to the system for one or more user-generated specific sensitivity classifications. In an embodiment, the ML/AI can recommend certain sublevel contextual sensitivity classifications, but those classifications are not made part of the data classification system unless approved by a user who understands the specific context for the data. Thus, in an embodiment even ML/AI-recommended specific contextual sensitivity classifications can still be considered user-generated because a user having an understanding of the use of the data must affirmatively approve, and thereby generate the actual classification within the system.

In certain other embodiments, program instructions to implement the functions or acts specified herein, e.g., ML processing based on AI or rules-based metadata analysis, are stored in a non-transitory storage device and are accessible and executable by a processor to implement functions or acts specified herein, such as various analytical and classification steps, and providing multiple levels of contextual categorization along with refinement/reduction of the data. Based on the user-generated specific contextual sensitivity classification, the system is configured to train, learn and execute ML/AI to generate a model representation for future automatic contextual classification of any unstructured and unstructured data inventory after the data has been filtered through the privacy and ROTA analysis steps.

In another embodiment, the system is designed and enabled such that any single document (retrieved from the initial enterprise data inventory) can be reliably and quickly classified by the LCCs. In an embodiment, the system is enabled with various ML/AI algorithms, for example, regex and heuristics classification algorithms for analyzing and classifying well-known data. For certain unknown data sets, the machine-generated contextual classification engine within the established LCC can provide further contextual classification of the data.

In another embodiment, a data-driven intelligent predictive system for automatic contextual data classification, e.g., managing and contextually classifying data via ML technology based on AI, is provided. The system is configured with various modules (e.g., identification module (IM), classification module, clustering and/or analysis modules (CCM)) running ML classification techniques such as ZeroR, decision tree, random forest, k-nearest neighbor, support vector machines, naive Bayes classifiers and other similar ML based on AI classification techniques. The ML/AI contextual classification engine is further enabled with means for AI-based deep learning based on the user-generated specific contextual sensitivity classification of the data. For example, the system may provide AI-based training of the various modules (IM, CCM, etc.) by constructing a neural network of multiple hidden layers for future contextual data classification via ML/AI-based classification techniques.

The system may be enabled to work in conjunction with a trained ML/AI for improving the contextual classification and cluster analysis of the reduced data sets. The ML/AI-based contextual classification system is designed for improving the contextual classification and cluster analysis performance for any future unclassified data sets wherein the unclassified data sets are automatically contextually classified and cluster analyzed for contextual classification of the data or presentation of data attributes to assist a user in making manual classification indications.

The system disclosed herein differs from known and conventional technological methods by identifying and classifying (via LCCs) what the data is used for, as opposed to asking what the data is. Because all data that is not ROTA necessarily has a use (or else it would be one or more of ROTA), embodiments successfully categorizes 100% of the data into a specific contextual classification without having a catch-all, non-specific classification such as "miscellaneous" or "other." Because all classified data has a use, all classified data will necessarily have a specific classification that relates specifically to that use.

An example will demonstrate the difference between ordinary ML-based classification systems and the present contextual classification system. In an ordinary classification system based on what the data content is, a part drawing for a piece of equipment may be classified as highly sensitive (e.g., "Restricted") because part drawings are often kept as trade secrets. In fact, in the data set, there may be hundreds, thousands or even millions of technical drawings (including part drawings), and without any contextual input by a data custodian, even the best ML/AI system will not be able to distinguish between sensitive part drawings and less sensitive ones, and may recognize detailed part drawings as something that ought to be classified as "Restricted." However, certain part drawings (depending on the use) may be internally sensitive, while others may be a third party's drawing, or an otherwise public document, or a drawing that is associated with a parts manual that the company readily discloses to its customers.

A contextual classification system may identify that drawing as highly sensitive, but it may also learn to identify it as public, or restricted (e.g., for customers only) based on contextual input provided to the classification engine by a custodian of that data or via reference to metadata, as described herein. In that way, data that may seem to be one thing based on what it is can be more accurately classified based on what it is used for.

Figure 10:
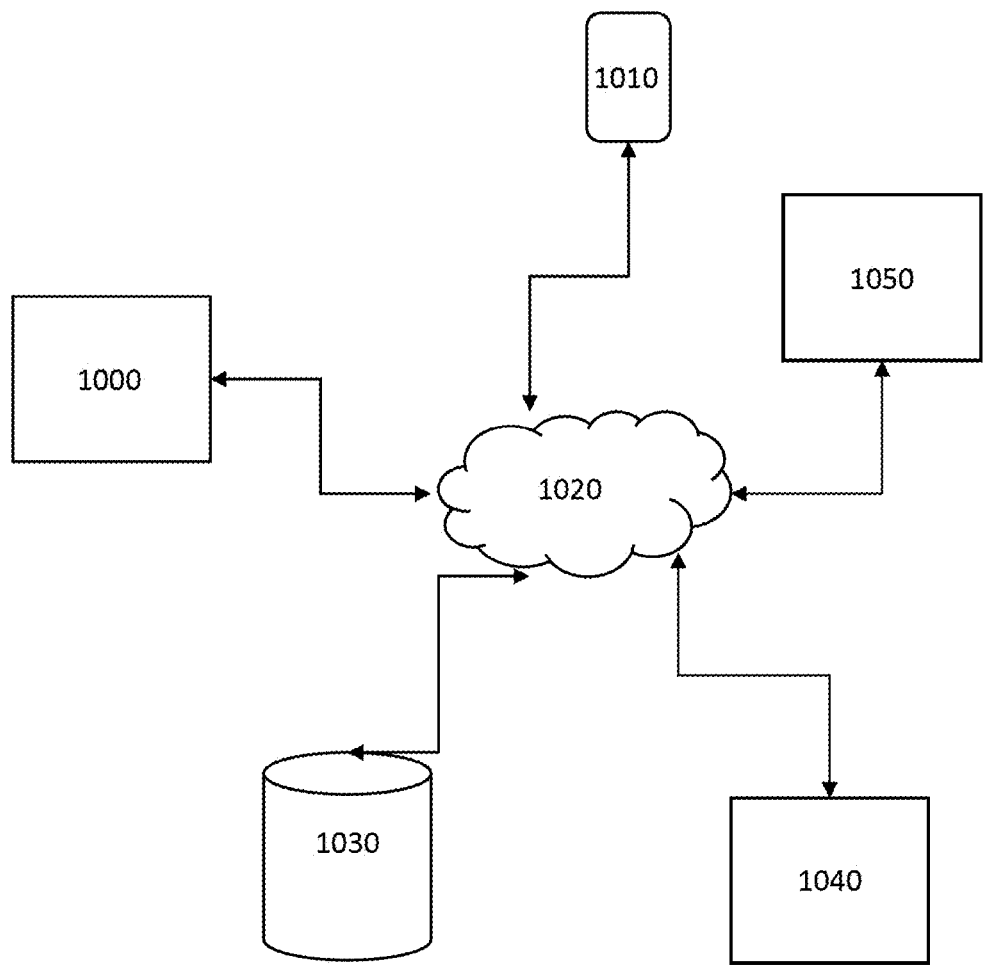
FIG. 10 illustrates an embodiment of the contextual classification engine having user interfaces and connected to servers having embedded processors configured to run a hybrid rules-based and machine learning-based artificial intelligence system and method for contextual categorization of data stored in one or more data repositories.

Referring to the example of FIG. 10, the system comprises devices 1000 and 1010 having user interfaces (UIs) that can provide connectivity where one or more users can log into the system via a local-area network (LAN), the Internet, an Intranet, a wide-area network (WAN) and/or other similar networks. The devices 1000 and 1010 are further connected to servers 1020 having embedded processors configured to run a hybrid rules-based and machine learning-based artificial intelligence system and method for contextual categorization of data, e.g., stored in one or more data repositories 1030, in order to provide proactive identification and lifecycle management of data. In some examples, the implementation may be restricted, for example servers 1020 may be implemented in a private cloud and restrict access via devices 1000 and 1010 to those from a specific location.

In another embodiment, a system provides a contextual classifier engine (CCE), e.g., implemented in a cloud service hosting servers 1020, for efficient and faster inventorying and classifying of unstructured and unclassified data across the enterprise. The contextual classifier engine can classify enterprise data across the enterprise at a much larger scale and efficiency than any currently available conventional contextual classification systems primarily to use metadata to assist the user in classifying the data.

As shown in FIG. 10, one or more data connectors may be provided by servers 1020 for connecting to one or more external sources 1040, e.g., connection via a communications network to external data sources such as email service providers, data streaming services, directory services, could ML/AI services, etc. This may facilitate data ingestion to or data enrichment for delivery to servers 1020 for data ingestion and subsequent classification. Further, other external systems 1050 may be connected to servers 1020 to facilitate output processing, such as data output from servers 1020 following classification of data to trigger a workflow in external systems 1050, implementing robotic process automation in external services 1050, etc.

Embodiments of the invention disclosed herein can also include novel workflows for managing data associated with the disclosed contextual classification system. In one embodiment, the workflow may include accessing an initial inventory data set and metadata associated with the initial inventory data set, and classifying, using the metadata, the initial inventory data set into a set of (a) a reduced data set comprising high level sensitivity classifications and (b) a remainder data set. In one or more embodiments, the types of metadata used in the classification process may include:

(1) Descriptive metadata, for example, the descriptive information about a resource. Descriptive metadata can be used for discovery and identification any may include elements such as title, abstract, author, keywords, file creation date, file last-accessed date, and file last modified date.

(2) Structural metadata, for example, metadata about containers of data indicating how compound objects are put together, for example, how pages are ordered to form chapters. Structural metadata describes the types, versions, relationships and other characteristics of digital materials.

(3) Administrative metadata, for example, the information to help manage a resource, like resource type, permissions, and when and how it was created.

(4) Reference metadata, for example, the information about the contents and quality of statistical data.

(5) Statistical metadata, also called process data, which may describe processes that collect, process, or produce statistical data.

(6) Legal metadata, for example, metadata that provides information about the creator, copyright holder, and public licensing.

In embodiments of the disclosed system, the classifying is executed in accordance with a query referring to the information contained within the metadata. The classification query is may searching by referring to at least one of the means of creation of the data, the purpose of the data, the time and date of creation, the user or user group having access to a file, as indicated via directory services, creator or author of the data, and the location on a computer network where the data was created. Further queries may also include determining if the user or user group having access to a file, as indicated via directory services, or a creator or the author belongs to a division or department handling privacy data such as personally identifiable information.

Embodiments of the disclosed system include receiving, from a client device, user input via an interface indicating the user-generated, context-specific classification rule. The workflow also includes applying the user-generated, context-specific classification rule to the reduced data; and triggering, based on classification of data into a category associated with the context-specific classification rule, a workflow. In one such embodiment, the workflow involves the triggering sending an instruction to an external system, where the instruction is a communication directed to an end user. The workflow may be is configured in a GUI. In one embodiment of the workflow, the workflow uses data classification(s) to indicate privacy related data at risk and may update a risk score using a risk model that accepts data derived from the data classification(s) as input. In another step of the workflow, the data is classified into a category associated with the context-specific classification rule, which may include one or more of deleting the data, encrypting the data, archiving the data, migrating the data, labeling the data, and communicating at least part of the data or a summary thereof to an end user.

Additional embodiments of the invention include methods of data ingestion. In one such embodiment, a method of data ingestion involves displaying a library of application or storage repository connectors for connecting one or more data sources to a data classification system. Via one or more of the connectors, one or more of an initial inventory data set and metadata associated with the initial inventory data set can be obtained. The system can classify, based on the metadata, the initial inventory data set into a set of (a) a reduced data set comprising high level sensitivity classifications and (b) a remainder data set. A user can input, via a graphical user interface, one or more user-generated, context-specific classification rules. The system can apply the user-generated, context-specific classification rule to the reduced data, and apply the user-generated, context-specific classification rule to the reduced data to create a first subset of context-specific classified data and a second subset of unclassified data. The library of connectors may include connectors for programmatically connecting to one or more of a directory service, an e-mail service, a database/storage lake, a streaming data service, and a ML/AI service. In one or more embodiments, the library of connectors includes connectors for processing data of the initial inventory of data via calling an external service to perform data extraction or classification, and/or via receiving metadata labels provided by an external service that extracts data from documents of the initial inventory data set.

All references, including publications, patent applications and patents, cited herein are hereby incorporated by reference to the same extent as if each reference were individually and specifically indicated to be incorporated by reference and were set forth in its entirety herein.

The embodiments disclosed herein can be implemented using one or more general purpose computer systems, microprocessors, digital signal processors or micro-controllers—programmed according to the teachings of the embodiments of the present invention—the embodiments not limited to any specific combination of hardware and/or software. In addition, the embodiments of the present invention can include software for controlling the devices and subsystems, for driving the devices and subsystems, and for enabling the devices and subsystems to interact with a human user. Such software can include, but is not limited to, device drivers, firmware, operating systems, development tools and other applications software. Computer readable media can further include the computer program product of an embodiment of the present invention for performing all or a portion (if processing is distributed) of the processing performed in implementing the invention. Computer-code devices of the illustrative embodiments of the present invention can include any suitable interpretable or executable code mechanism.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for contextual classification of data, the system comprising:
    at least one server having at least one processor and connected to a display device;
    a non-transitory computer-readable storage medium in electronic communication with the at least one processor; the non-transitory computer-readable storage medium comprising program instructions coded in machine learning-based algorithms for contextually classifying the data;
    an initial inventory of applicable data set stored within the computer-readable storage medium;
    wherein the processor is configured to:
        receive an initial inventory of the data set and associated metadata to be categorized;
        implement a library of contextual classifiers, the library of contextual classifiers comprising (1) a set of predetermined high level sensitivity classifications, and (2) a set of user-generated business-specific sensitivity classifications subordinated below the high level sensitivity classifications;
        apply the set of predetermined high level sensitivity classification to the initial inventory of data set based upon the metadata;
        identify and remove any redundant, outdated, trivial or abandoned (ROTA) data from the initial inventory of data set to create a reduced data set and a remainder data set of ROTA data;
        display on a screen of the display device an interactive summary of the reduced data set and the remainder data set;
        apply the user-generated business-specific sensitivity classifications to the reduced data set to create a first set of classified data and a second set of unclassified data; and
    wherein the processor is further configured and enabled to iteratively apply additional user-generated business-specific sensitivity classifications to both the first set of classified data set and the second set of unclassified data until all data in the reduced data set has been classified in exactly one use-generated business-specific sensitivity classification.

2. The system of claim 1 further configured to apply the user-generated business-specific sensitivity classifications to the remainder data set.

3. The system of claim 1 further configured to utilize machine learning and artificial intelligence in the applying and iteratively applying steps.

4. The system of claim 3 wherein a machine learning module recommends one or more user-generated business-specific sensitivity classifications.

5. The system of claim 1 wherein the applying and iteratively applying step are achieved by reference to the metadata of the reduced data set.

6. A method of contextual classification of data, the method comprising the steps of:
    configuring at least one server having at least one processor and connected to a display device;
    configuring a computer-readable storage medium to be in electronic communication with the at least one processor;
    storing program instructions coded in machine learning-based algorithms within the computer-readable storage medium;
    receiving an initial inventory of data set and associated metadata to be categorized;
    storing the initial data set within the computer-readable storage medium;
    establishing a library of contextual classifiers, the library of contextual classifiers comprising (1) a set of predetermined high level sensitivity classifications, and (2) a set of user-generated business-specific sensitivity classifications subordinated below the high level sensitivity classifications;
    applying the set of predetermined high level sensitivity classifications to the initial inventory of data set based upon the metadata;
    identifying and removing any redundant, outdated, trivial or abandoned (ROTA) data from the initial inventory of data set to create a reduced data set and a remainder data set of ROTA data;
    displaying on a screen of the display device an interactive summary of a reduced data set and a remainder data set;
    applying the user-generated business-specific sensitivity classifications to the reduced data set to create a first set of classified data and a second set of unclassified data; and
    configuring and enabling the processor to iteratively apply additional user-generated business-specific sensitivity classifications to both the first set of classified data set and the second set of unclassified data until all data in the reduced data set has been classified in exactly one use-generated business-specific sensitivity classification.

7. The method of claim 6 further comprising the steps of applying the user-generated business-specific sensitivity classifications to the remainder data set.

8. The method of claim 6 further comprising the steps of utilizing machine learning and artificial intelligence in the applying and iteratively applying steps.

9. The method of claim 8 wherein a machine learning module recommends one or more user-generated business-specific sensitivity classifications.

10. The method of claim 6 wherein the applying and iteratively applying step are achieved by reference to the metadata of the reduced data set.

11. A process for contextual categorization of data, the process comprising the steps of:
- receiving an initial data set to be categorized, the initial data set being associated with metadata;
- establishing a library of contextual classifiers, the library comprising (1) a set of predetermined high level sensitivity classifications and (2) a set of user-generated business-specific sensitivity classifications subordinated below the high level sensitivity classifications;
- applying, based upon the metadata, the set of predetermined high level sensitivity classifications to the initial data set;
- identifying and removing redundant, outdated, trivial or abandoned (ROTA) data from the initial data set to create a reduced data set and a remainder data set of ROTA data;
- applying the user-generated business-specific sensitivity classifications to the reduced data set to create a first set of classified data and a second set of unclassified data; and
- iteratively applying additional user-generated to the both the first set of classified data and the second set of unclassified data until all data in the reduced data set has been classified in exactly one use-generated business-specific sensitivity classification.

12. The process of claim 11 further comprising the step of applying the user-generated business-specific sensitivity classifications to the remainder data set.

13. The process of claim 11 further comprising the step of utilizing machine learning and artificial intelligence in the applying and iteratively applying steps.

14. The process of claim 11 wherein a machine learning module recommends one or more user-generated business-specific sensitivity classifications.

15. The process of claim 11 wherein the applying and iteratively applying step are achieved by reference to the metadata of the reduced data set.

* * * * *